(12) United States Patent
Wei

(10) Patent No.: US 10,380,717 B2
(45) Date of Patent: Aug. 13, 2019

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/805,691

(22) Filed: Nov. 7, 2017

(65) Prior Publication Data
US 2018/0150936 A1 May 31, 2018

(30) Foreign Application Priority Data

Nov. 29, 2016 (CN) .......................... 2016 1 1078876

(51) Int. Cl.
| | |
|---|---|
| *G06T 3/40* | (2006.01) |
| *H04N 19/176* | (2014.01) |
| *H04N 19/186* | (2014.01) |
| *G06T 7/11* | (2017.01) |
| *G06T 5/00* | (2006.01) |
| *H04N 5/369* | (2011.01) |

(Continued)

(52) U.S. Cl.
CPC .......... *G06T 3/4007* (2013.01); *G06T 3/4015* (2013.01); *G06T 5/002* (2013.01);
(Continued)

(58) Field of Classification Search
CPC ....... G06T 3/4007; G06T 3/4015; G06T 7/11; G06T 5/002; G06T 5/003;
(Continued)

(56) References Cited

U.S. PATENT DOCUMENTS

| | | | |
|---|---|---|---|
| 6,829,008 B1 | 12/2004 | Kondo et al. | |
| 8,818,085 B2 * | 8/2014 | Palum .................. | G06T 3/4015 348/272 |

(Continued)

FOREIGN PATENT DOCUMENTS

| | | |
|---|---|---|
| CN | 102694956 A | 9/2012 |
| CN | 101815157 B | 1/2013 |

(Continued)

OTHER PUBLICATIONS

PCT/CN2017/081916 International Search Report and Written Opinion dated Aug. 3, 2017, 12 pages.

(Continued)

*Primary Examiner* — Amandeep Saini
(74) *Attorney, Agent, or Firm* — Lathrop Gage LLP

(57) ABSTRACT

An image processing method is provided. The image sensor outputs a merged image and a color-block image in a same scene. A preset target region is identified in the merged image. A part of the color-block image corresponding to a part of the merged image beyond the preset target region is converted into a first image using a first interpolation algorithm, and a part of the merged image within the preset target region is converted into a second image using a second interpolation algorithm. The first image and the second image are merged into a simulation image. An image processing apparatus and an electronic device are provided. With the image processing method and apparatus, and the electronic device the situation that the image sensor needs to take a long work to output a high quality image can be avoided, thus reducing the work time and improving the work efficiency.

20 Claims, 14 Drawing Sheets

(51) Int. Cl.
*H04N 1/387* (2006.01)
*H04N 5/235* (2006.01)
*H04N 5/347* (2011.01)
*H04N 5/355* (2011.01)
*H04N 5/3745* (2011.01)
*H04N 9/04* (2006.01)

(52) U.S. Cl.
CPC ............... *G06T 5/003* (2013.01); *G06T 7/11* (2017.01); *H04N 1/3871* (2013.01); *H04N 5/2355* (2013.01); *H04N 5/347* (2013.01); *H04N 5/35563* (2013.01); *H04N 5/369* (2013.01); *H04N 5/3745* (2013.01); *H04N 9/045* (2013.01); *H04N 19/176* (2014.11); *H04N 19/186* (2014.11); *G06T 2207/20221* (2013.01); *H04N 2209/046* (2013.01)

(58) Field of Classification Search
CPC ........ G06T 2207/20221; H04N 19/186; H04N 5/3745; H04N 5/35563; H04N 5/347; H04N 5/2355; H04N 1/3871; H04N 19/176; H04N 9/045; H04N 5/369; H04N 2209/046
USPC .......................................................... 382/103
See application file for complete search history.

(56) References Cited

U.S. PATENT DOCUMENTS

2009/0200451 A1  8/2009  Conners
2013/0329989 A1* 12/2013 Palum .................. G06T 3/4015
                                                    382/162
2016/0037060 A1  2/2016  Lim et al.

FOREIGN PATENT DOCUMENTS

| | | |
|---|---|---|
| CN | 105578072 A | 5/2016 |
| CN | 105578076 A | 5/2016 |
| CN | 105578078 A | 5/2016 |
| CN | 105592303 A | 5/2016 |
| CN | 106357967 A | 1/2017 |
| CN | 106506984 A | 3/2017 |
| DE | 102011100350 A1 | 11/2012 |
| EP | 2753082 A1 | 7/2014 |
| EP | 3229467 A1 | 10/2017 |

OTHER PUBLICATIONS

European Patent Application No. 17201090.2 extended Search and Opinion dated Apr. 18, 2018, 13 pages.

Battiato S., et al: "Bayer image enlargement using correlated color components", 2002 Digest of Technical Papers / ICCE, International Conference On Consumer Electronics, Twenty-First In The Series, Jun. 18-20, 2002, IEEE, Jun. 18, 2002 (Jun. 18, 2002), pp. 230-231, cited in office action from EPO for EP Application No. 17201090.2.

Chinese Patent Application No. 201611078876.3 English translation of Office Action dated Dec. 24, 2018, 9 pages.

Chinese Patent Application No. 201611078876.3 Office Action dated Dec. 24, 2018, 8 pages.

* cited by examiner

Merged image

| R | R | Gr | Gr |
|---|---|----|----|
| R | R | Gr | Gr |
| Gb | Gb | B | B |
| Gb | Gb | B | B | color-block image

Fig. 9

IMAGE PROCESSING METHOD AND APPARATUS, AND ELECTRONIC DEVICE

CROSS-REFERENCE TO RELATED APPLICATIONS

This application is based on and claims priority of Chinese Patent Application No. 201611078876.3 filed on Nov. 29, 2016, the entire contents of which are incorporated herein by reference.

FIELD

The present disclosure relates to the image processing technology, and more particularly to an image processing method, an image processing apparatus and an electronic device.

BACKGROUND

When an image is processed using a conventional image processing method, either the obtained image has a low resolution, or it takes a long time and too much resource to obtain an image with high resolution, both of which are inconvenient for users. Moreover, in a practical application, performing a high-resolution processing on a certain part may reduce user experience.

DISCLOSURE

The present disclosure aims to solve at least one of existing problems in the related art to at least some extent. Accordingly, the present disclosure provides an image processing method, an image processing apparatus and an electronic device.

Embodiments of the present disclosure provide an image processing method. The image processing method is applied in an electronic device. The electronic device includes an image sensor, the image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing method includes: outputting a merged image and a color-block image by the image sensor in a same scene, in which, the merged image includes an array of merged pixels, and the photosensitive pixels in a same photosensitive pixel unit are collectively output as one merged pixel, the color-block image includes image pixel units arranged in a preset array, each image pixel unit includes a plurality of original pixels, each photosensitive pixel unit corresponds to one image pixel unit, and each photosensitive pixel corresponds to one original pixel; identifying a preset target region in the merged image; converting a part of the color-block image corresponding to a part of the merged image beyond the preset target region into a first image using a first interpolation algorithm, in which, the first image includes first simulation pixels arranged in an array, and each photosensitive pixel corresponds to one first simulation pixel; converting a part of the merged image within the preset target region into a second image using a second interpolation algorithm, in which, the second image includes second simulation pixels arranged in an array, and each photosensitive pixel corresponds to one second simulation pixel, and a complexity of the second interpolation algorithm is less than that of the first interpolation algorithm; and merging the first image and the second image into a simulation image.

Embodiments of the present disclosure further provide an image processing apparatus. The image processing apparatus is applied in an electronic device. The electronic device includes an image sensor, and the image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing apparatus includes a non-transitory computer-readable medium including computer-readable instructions stored thereon, and an instruction execution system which is configured by the instructions to implement at least one of an output module, an identifying module, a first converting module, a second converting module, and a merging module. The output module is configured to output a merged image and a color-block image by the image sensor in a same scene, in which, the merged image includes an array of merged pixels, and the photosensitive pixels in a same photosensitive pixel unit are collectively output as one merged pixel, the color-block image includes image pixel units arranged in a preset array, each image pixel unit includes a plurality of original pixels, each photosensitive pixel unit corresponds to one image pixel unit, and each photosensitive pixel corresponds to one original pixel. The identifying module is configured to identify a preset target region in the merged image. The first converting module is configured to convert a part of the color-block image corresponding to a part of the merged image beyond the preset target region into a first image using a first interpolation algorithm, in which, the first image includes first simulation pixels arranged in an array, and each photosensitive pixel corresponds to one first simulation pixel. The second converting module is configured to convert a part of the merged image within the preset target region into a second image using a second interpolation algorithm, in which, the second image includes second simulation pixels arranged in an array, and each photosensitive pixel corresponds to one second simulation pixel, and a complexity of the second interpolation algorithm is less than that of the first interpolation algorithm. The merging module is configured to merge the first image and the second image into a simulation image.

Embodiments of the present disclosure provide an electronic device. The electronic device includes a housing, a processor, a memory, a circuit board, a power supply circuit and an imaging apparatus. The circuit board is enclosed by the housing. The processor and the memory are positioned on the circuit board. The power supply circuit is configured to provide power for respective circuits or components of the electronic device. The imaging apparatus includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The memory is configured to store executable program codes. The processor is configured to run a program corresponding to the executable program codes by reading the executable program codes stored in the memory, to perform the image processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 9 is a schematic diagram of a color-block image according to an embodiment of the present disclosure.

EMBODIMENTS OF THE PRESENT DISCLOSURE

Figure 1:
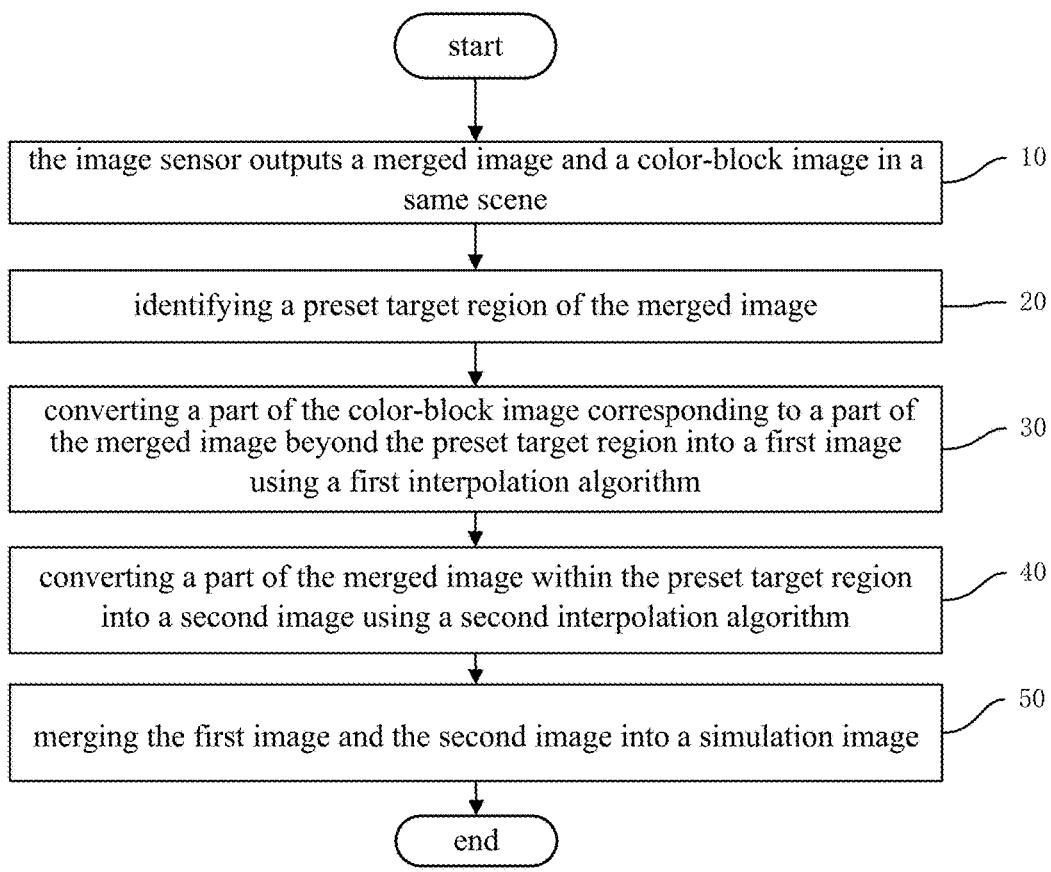
FIG. 1 is a flow chart of an image processing method according to an embodiment of the present disclosure.

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor is controlled to output a merged image, which can be converted into a merged true-color image by an image processing method and saved. The merged image includes an array of merged pixels, and a plurality of photosensitive pixels in a same photosensitive pixel unit are collectively outputted as one merged pixel. Thus, a signal-to-noise ratio of the merge image is increased. However, a resolution of the merged image is reduced.

Certainly, the image sensor can be controlled to output a high pixel color-block image, which includes an array of original pixels, and each photosensitive pixel corresponds to one original pixel. However, since a plurality of original pixels corresponding to a same filter unit have the same color, the resolution of the color-block image still cannot be increased. Thus, the high pixel color-block image needs to be converted into a high pixel simulation image by an interpolation algorithm, in which the simulation image includes a Bayer array of simulation pixels. Then, the simulation image can be converted into a simulation true-color image by an image processing method and saved. However, the interpolation algorithm consumes resource and time, and the simulation true-color image is not required in all scenes.

Thus, embodiments of the present disclosure provide a novel image processing method.

Figure 2:
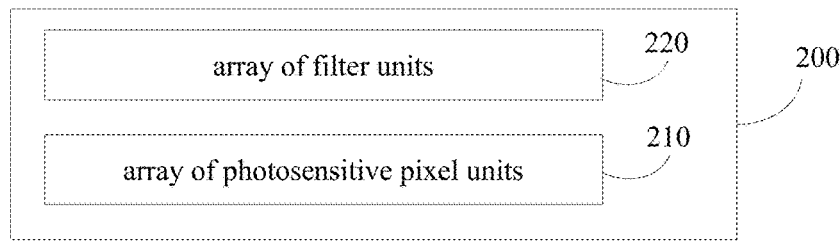
FIG. 2 is a block diagram of an image sensor according to an embodiment of the present disclosure.
Figure 3:
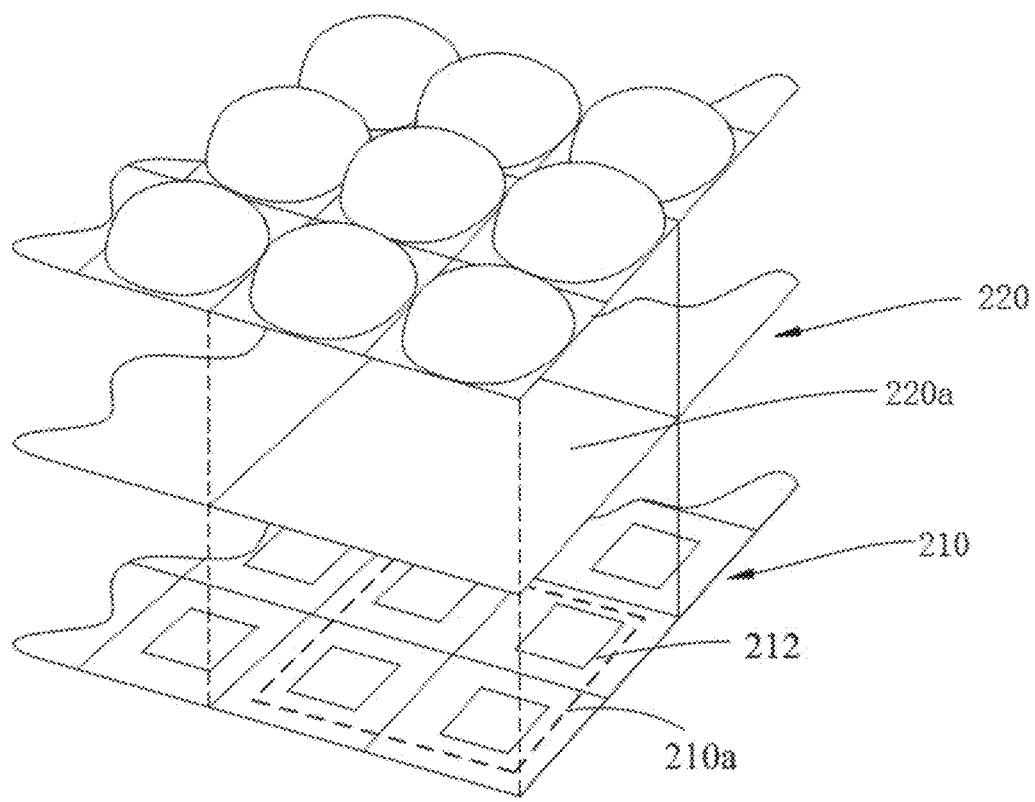
FIG. 3 is a schematic diagram of an image sensor according to an embodiment of the present disclosure.

Referring to FIG. 1, an image processing method is illustrated. The image processing method is applied in an electronic device. The electronic device includes an imaging apparatus including an image sensor. As illustrated in FIGS. 2 and 3, the image sensor 200 includes an array 210 of photosensitive pixel units and an array 220 of filter units arranged on the array 210 of photosensitive pixel units. Each filter unit 220a corresponds to one photosensitive pixel unit 210a. In at least one embodiment, there is a one-to-one correspondence between the filter units and the photosensitive pixel units. Each photosensitive pixel unit 210a includes a plurality of photosensitive pixels 212. The image processing method includes the following.

At block 10, the image sensor outputs a merged image and a color-block image in a same scene.

The merged image includes an array of merged pixels, and the photosensitive pixels in a same photosensitive pixel unit are collectively output as one merged pixel. The color-block image includes image pixel units arranged in a preset array, each image pixel unit includes a plurality of original pixels, each photosensitive pixel unit corresponds to one image pixel unit. In at least one embodiment, there is a one-to-one correspondence between the photosensitive pixel units and the image pixel units. Each photosensitive pixel corresponds to one original pixel. In at least one embodiment, there is a one-to-one correspondence between the photosensitive pixels and the original pixels.

At block 20, a preset target region is identified in the merged image.

At block 30, a part of the color-block image corresponding to a part of the merged image beyond the preset target region is converted into a first image using a first interpolation algorithm.

The first image includes first simulation pixels arranged in an array, and each photosensitive pixel corresponds to one first simulation pixel. In at least one embodiment, there is a one-to-one correspondence between the photosensitive pixels and the first simulation pixels.

The preset target region may refer to a region including a target object, such as a human face.

At block 40, a part of the merged image within the preset target region is converted into a second image using a second interpolation algorithm.

The second image includes second simulation pixels arranged in an array, and each photosensitive pixel corresponds to one second simulation pixel. In at least one embodiment, there is a one-to-one correspondence between the photosensitive pixels and the second simulation pixels. A complexity of the second interpolation algorithm is less than that of the first interpolation algorithm.

At block 50, the first image and the second image are merged into a simulation image.

With the image processing method according to embodiments of the present disclosure, the first interpolation algorithm is adopted for the part of the color-block image corresponding to a part of the merged image beyond the preset target region so as to improve distinguishability and resolution of the image beyond the preset target region, and the second interpolation algorithm with complexity less than that of the first interpolation algorithm is adopted for the part of the merged image within the preset target region, the algorithm complexity includes the time complexity and the space complexity, such that SNR (signal to noise ratio), distinguishability and resolution of the image are improved, and time required for image processing is reduced, thereby improving user experience.

Since the first interpolation algorithm is adopted for the part of the color-block image corresponding to a part of the merged image beyond the preset target region, the second interpolation algorithm is adopted for the part of the merged image within the preset target region (the second interpolation algorithm has a complexity including the time complexity and the space complexity both less than those of the first interpolation algorithm), only a part of the image is processed using the first interpolation algorithm with greater complexity, such that the time required for image processing is reduced and quality of the part of the image is improved. Meanwhile, the part of the image within the preset target region (such as a region having a human face) has a lower distinguishability than the part of the image beyond the preset target region, thus the user obtains a better shooting experience.

Figure 4:
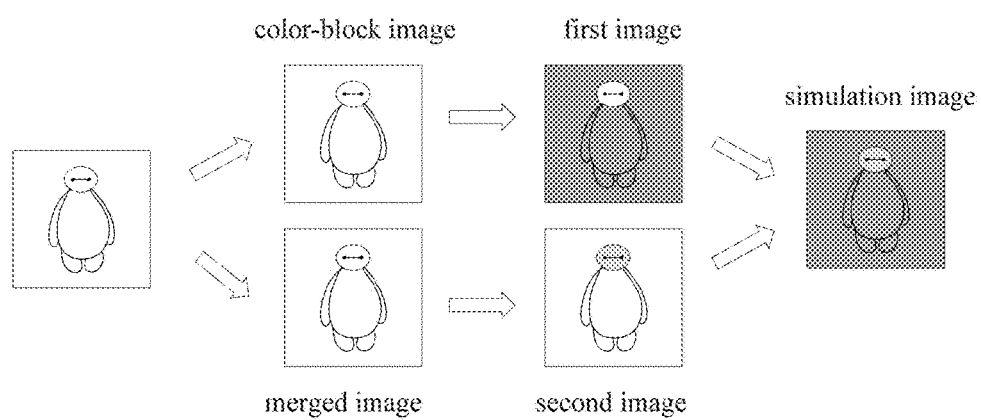
FIG. 4 is a schematic diagram illustrating a process of merging a first image and a second image according to an embodiment of the present disclosure.

Referring to FIG. 4, a process of merging the first image and the second image is illustrated. A part of the color-block image corresponding to a part of the merged image beyond the preset target region is processed using the first interpolation algorithm to acquire the first image, and the merged image within the preset target region is processed using the second interpolation algorithm to acquire the second image, and then the first image and the second image are merged into a simulation image. In this way, a part of the simulation image beyond the preset target region has a high resolution.

Figure 5:
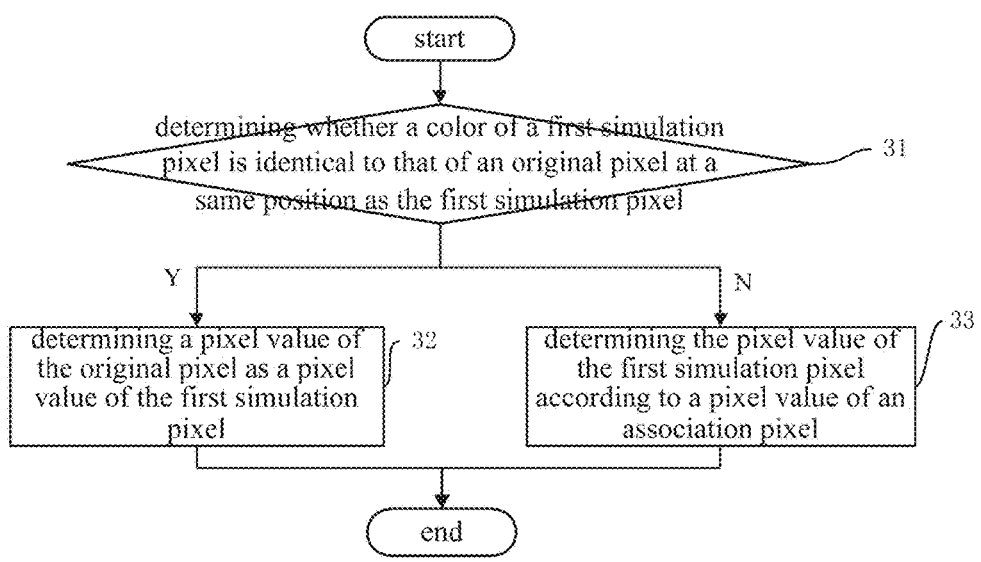
FIG. 5 is a flow chart showing a process of converting a part of the color-block image into a first image according to an embodiment of the present disclosure.

Referring to FIG. 5, in some implementations, the act at block 30 includes the following.

At block 31, it is determined whether a color of a first simulation pixel is identical to that of an original pixel at a same position as the first simulation pixel, if yes, an act at block 32 is executed, otherwise, an act at block 33 is executed.

At block 32, a pixel value of the original pixel is determined as a pixel value of the first simulation pixel.

At block 33, the pixel value of the first simulation pixel is determined according to a pixel value of an association pixel.

The association pixel is selected from an image pixel unit with a same color as the first simulation pixel and adjacent to an image pixel unit including the original pixel.

Figure 6:
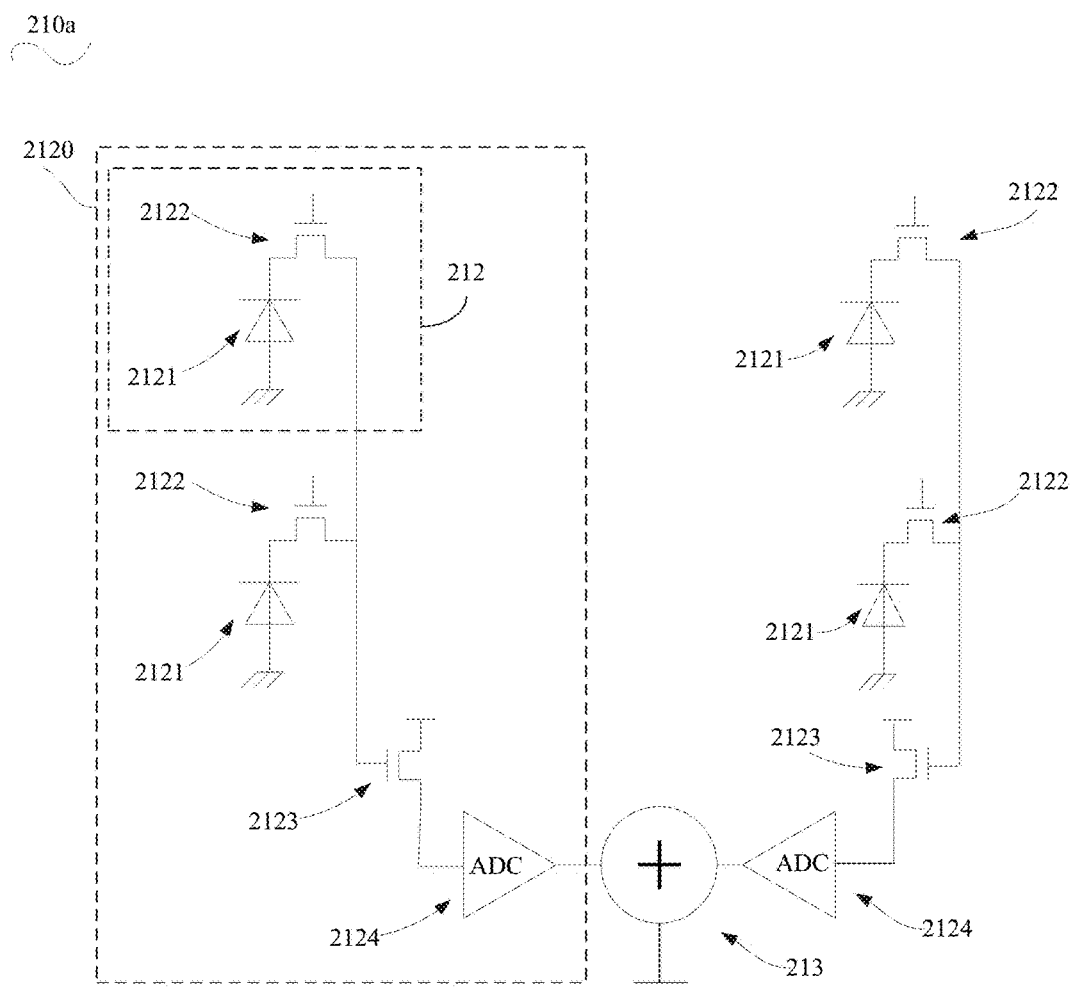
FIG. 6 is a schematic diagram illustrating a circuit of an image sensor according to an embodiment of the present disclosure.
Figure 7:
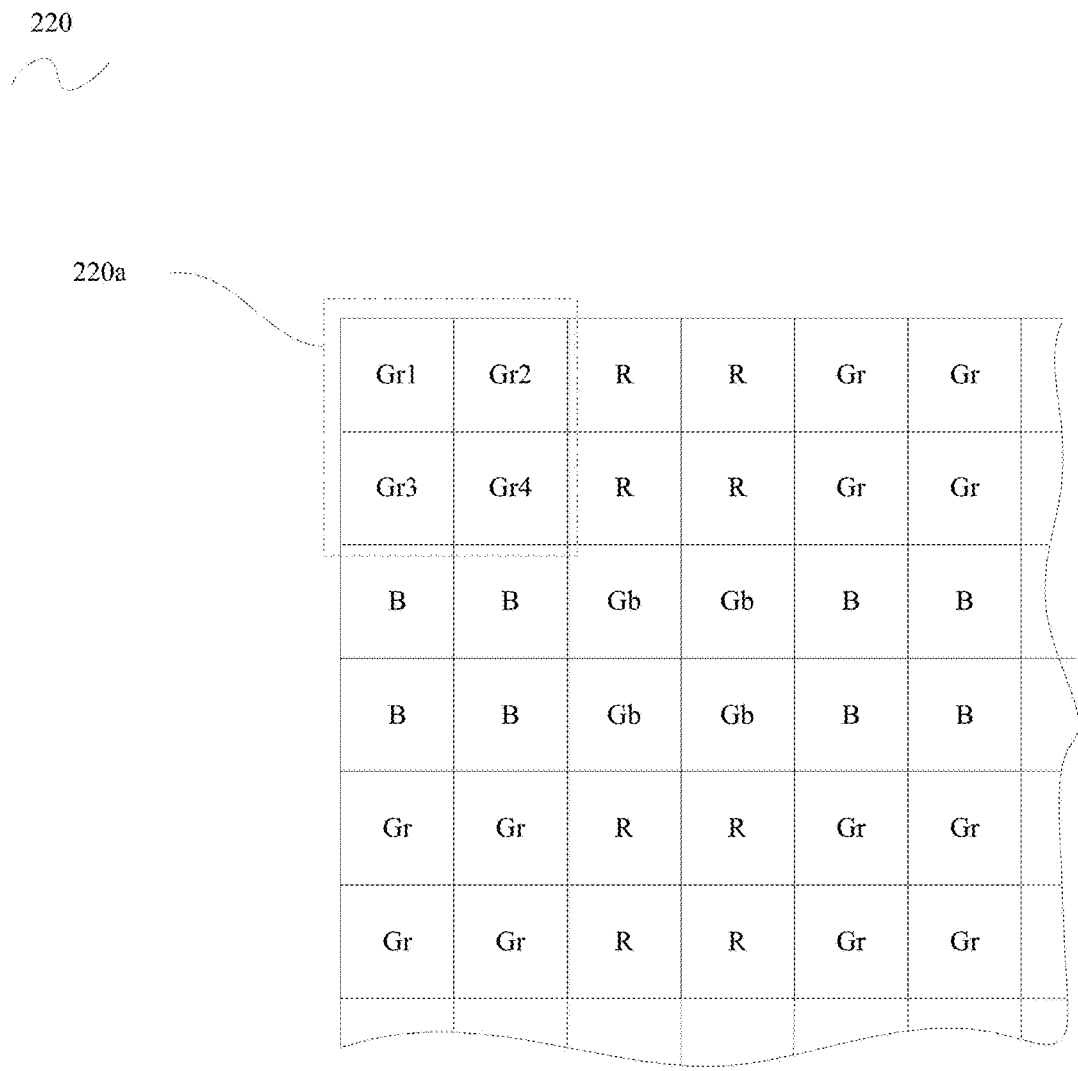
FIG. 7 is a schematic diagram of an array of filter units according to an embodiment of the present disclosure.

FIG. 6 is a schematic diagram illustrating a circuit of an image sensor according to an embodiment of the present disclosure. FIG. 7 is a schematic diagram of an array of filter units according to an embodiment of the present disclosure. FIGS. 2-3 and 6-7 are better viewed together.

Referring to FIGS. 2-3 and 6-7, the image sensor 200 according to an embodiment of the present disclosure includes an array 210 of photosensitive pixel units and an array 220 of filter units arranged on the array 210 of photosensitive pixel units.

Further, the array 210 of photosensitive pixel units includes a plurality of photosensitive pixel units 210a. Each photosensitive pixel unit 210a includes a plurality of photosensitive pixels 212. Each photosensitive pixel 212 includes a photosensitive element 2121 and a transmission tube 2122. The photosensitive element 2121 may be a photodiode, and the transmission tube 2122 may be a MOS transistor.

The array 220 of filter units includes a plurality of filter units 220a. Each filter unit 220a corresponding to one photosensitive pixel unit 210a.

In detail, in some examples, the filter units are arranged in a Bayer array. In other words, four adjacent filter units 220a include one red filter unit, one blue filter unit and two green filter units.

Each photosensitive pixel unit 210a corresponds to a filter unit 220a with a same color. If a photosensitive pixel unit 210a includes n adjacent photosensitive elements 2121, one filter unit 220a covers n photosensitive elements 2121 in one photosensitive pixel unit 210a. The filter unit 220a may be formed integrally, or may be formed by assembling n separate sub filters.

In some implementations, each photosensitive pixel unit 210a includes four adjacent photosensitive pixels 212. Two adjacent photosensitive pixels 212 collectively form one photosensitive pixel subunit 2120. The photosensitive pixel subunit 2120 further includes a source follower 2123 and an analog-to-digital converter 2124. The photosensitive pixel unit 210a further includes an adder 213. A first electrode of each transmission tube 2122 in the photosensitive pixel subunit 2120 is coupled to a cathode electrode of a corresponding photosensitive element 2121. Second electrodes of all the transmission tubes 2122 in the photosensitive pixel subunit 2120 are collectively coupled to a gate electrode of the source follower 2123 and coupled to an analog-to-digital converter 2124 via the source electrode of the source follower 2123. The source follower 2123 may be a MOS transistor. Two photosensitive pixel subunits 2120 are coupled to the adder 213 via respective source followers 2123 and respective analog-to-digital converters 2124.

In other words, four adjacent photosensitive elements 2121 in one photosensitive pixel unit 210a of the image sensor 200 according to an embodiment of the present disclosure collectively use one filter unit 220a with a same color as the photosensitive pixel unit. Each photosensitive element 2121 is coupled to a transmission tube 2122 correspondingly. Two adjacent photosensitive elements 2121 collectively use one source follower 2123 and one analog-digital converter 2124. Four adjacent photosensitive elements 2121 collectively use one adder 213.

Further, four adjacent photosensitive elements 2121 are arranged in a 2-by-2 array. Two photosensitive elements 2121 in one photosensitive pixel subunit 2120 can be in a same row.

During an imaging process, when two photosensitive pixel subunits 2120 or four photosensitive elements 2121 covered by a same filter unit 220a are exposed simultaneously, pixels can be merged, and the merged image can be outputted.

In detail, the photosensitive element 2121 is configured to convert light into charge, and the charge is proportional to an illumination intensity. The transmission tube 2122 is configured to control a circuit to turn on or off according to a control signal. When the circuit is turned on, the source follower 2123 is configured to convert the charge generated through light illumination into a voltage signal. The analog-to-digital converter 2124 is configured to convert the voltage signal into a digital signal. The adder 213 is configured to add two digital signals for outputting.

Figure 8:
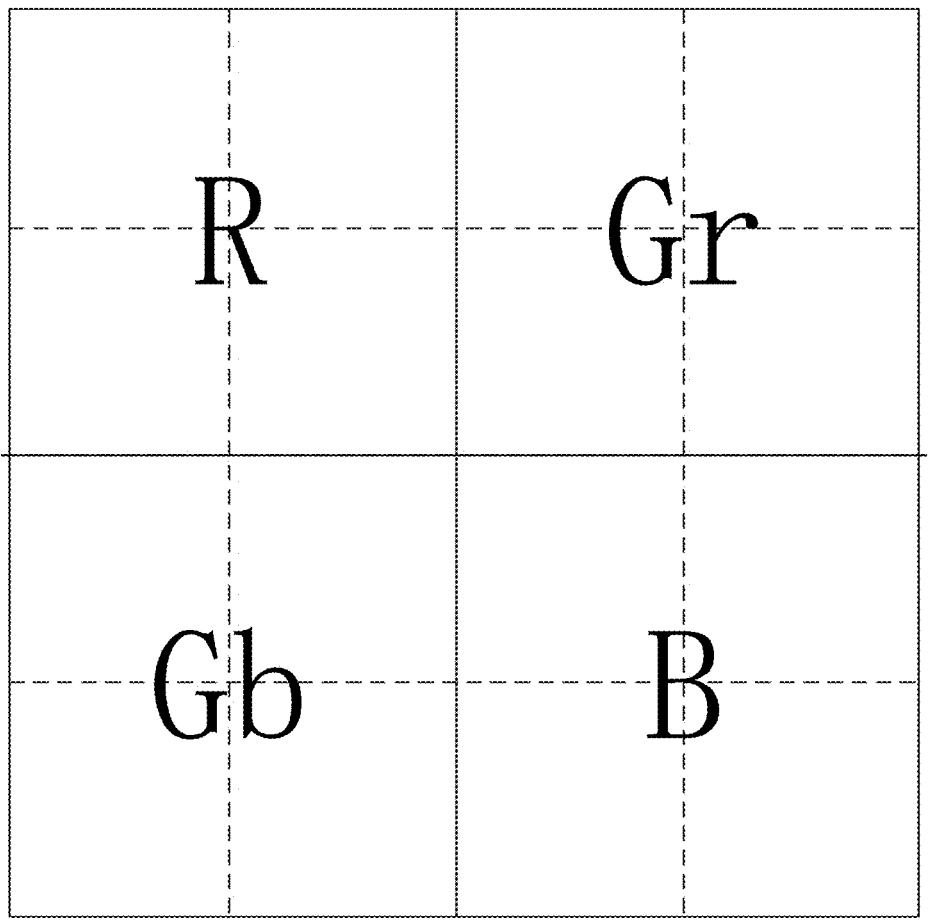
FIG. 8 is a schematic diagram of a merged image according to an embodiment of the present disclosure.

Referring to FIG. 8, take an image sensor 200 of 16M as an example. The image sensor 200 according to an embodiment of the present disclosure can merge photosensitive pixels 212 of 16M into photosensitive pixels of 4M, the image sensor 200 outputs the merged image. After the merging, the photosensitive pixel 212 quadruples in size, such that the photosensibility of the photosensitive pixel 212 is increased. In addition, since most part of noise in the image sensor 200 is random, there may be noise points at one or two pixels. After four photosensitive pixels 212 are merged into a big photosensitive pixel 212, an effect of noise points on the big photosensitive pixel is reduced, thus, the noise is weakened and SNR (signal to noise ratio) is improved.

However, when the size of the photosensitive pixel 212 is increased, the pixel value is decreased, and thus the resolution of the merged image is decreased.

During an imaging process, when four photosensitive elements 2121 covered by a same filter unit 220a are exposed in sequence, a color-block image is output.

In detail, the photosensitive element 2121 is configured to convert light into charge, and the charge is proportional to an illumination intensity. The transmission tube 2122 is configured to control a circuit to turn on or off according to a control signal. When the circuit is turned on, the source follower 2123 is configured to convert the charge generated through light illumination into a voltage signal. The analog-to-digital converter 2124 is configured to convert the voltage signal into a digital signal.

Referring to FIG. 9, take an image sensor 200 of 16M as an example. The image sensor according to an embodiment of the present disclosure can output photosensitive pixels 212 of 16M, the image sensor 200 outputs the color-block image. The color-block image includes image pixel units. The image pixel unit includes original pixels arranged in a 2-by-2 array. The size of the original pixel is the same as that of the photosensitive pixel 212. However, since a filter unit 220a covering four adjacent photosensitive elements 2121 has a same color (although four photosensitive elements 2121 are exposed respectively, the filter unit 220a covering the four photosensitive elements has a same color), four adjacent original pixels in each image pixel unit of the output image have a same color, and thus the resolution of the image cannot be increased.

The image processing method according to an embodiment of the present disclosure is able to process the output color-block image to obtain a simulation image.

In some embodiments, when a merged image is output, four adjacent photosensitive pixels 212 with the same color can be output as one merged pixel. Accordingly, four adjacent merged pixels in the merged image can be considered as being arranged in a typical Bayer array, and can be processed directly to output a merged true-color image. When a color-block image is output, each photosensitive pixel 212 is output separately. Since four adjacent photosensitive pixels 212 have a same color, four adjacent original pixels in an image pixel unit have a same color, which form an untypical Bayer array. However, the untypical Bayer array cannot be directly processed. In other words, when the image sensor 200 adopts a same apparatus for processing the image, in order to realize a compatibility of the true-color image outputs under two modes (the merged true-color image under a merged mode and the simulation true-color image under a color-block mode), it is required to convert the color-block image into the simulation image, or to convert the image pixel unit in an untypical Bayer array into pixels arranged in the typical Bayer array.

The simulation image includes simulation pixels arranged in the Bayer array. Each photosensitive pixel corresponds to one simulation pixel. One simulation pixel in the simulation image corresponds to an original pixel located at the same position as the simulation pixel and in the color-block image. According to embodiments of the present disclosure, the simulation image is merged by the first image and the second image. By using the first interpolation algorithm, the part of the color-block image corresponding to a part of the merged image beyond the preset target region can be coveted into the first image. The first image includes first simulation pixels arranged in an array and each photosensitive pixel corresponds to one first simulation pixel.

With the image processing method, the color-block image and the merged image are outputted respectively, and a preset target region such as a human face region is identified in the merged image. Based on a correspondence between the color-block image and the merged image, a part of the color-block image beyond the preset target region is converted into a Bayer array, and processed using the first interpolation algorithm.

Figure 10:
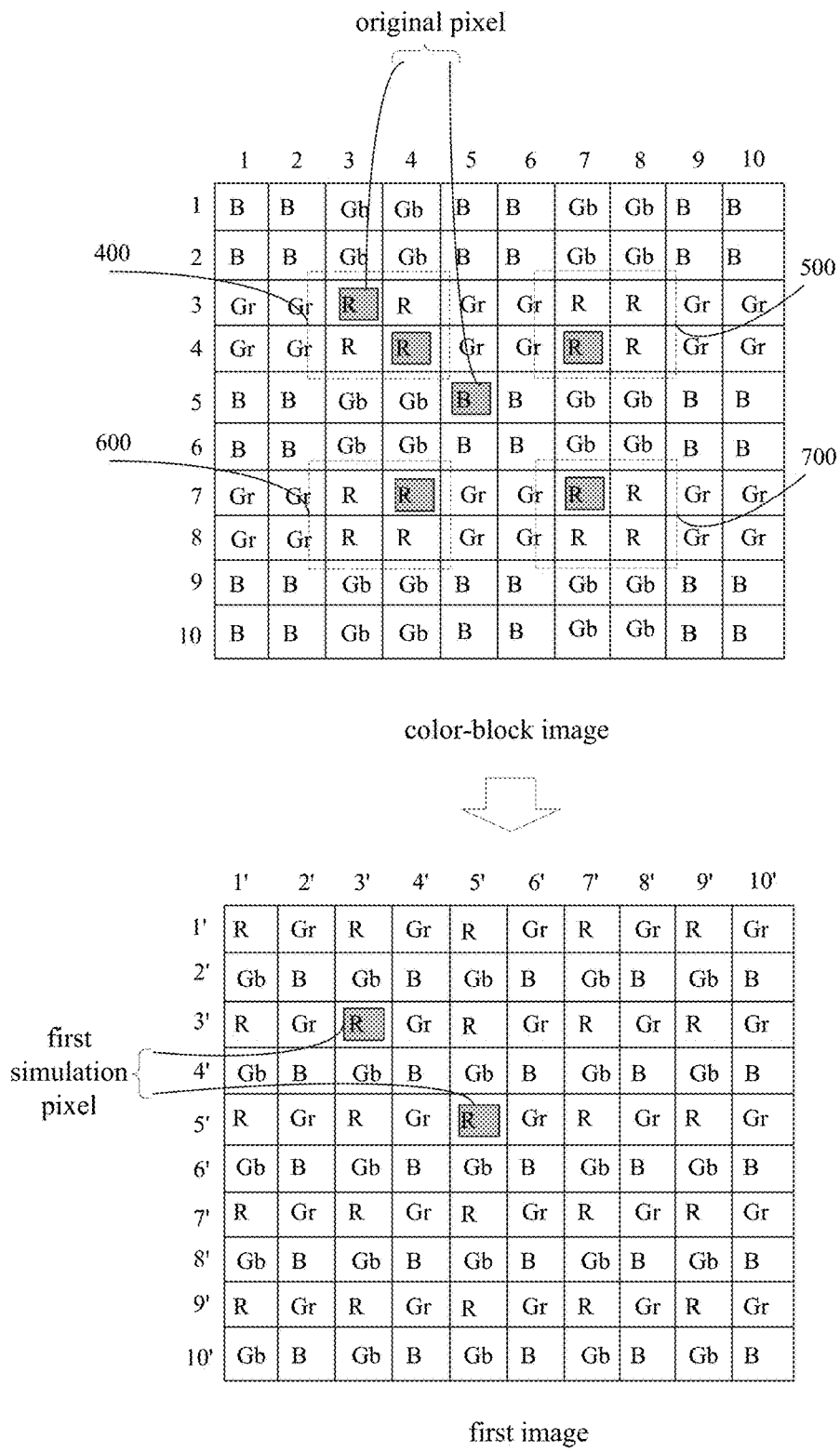
FIG. 10 is a schematic diagram illustrating a process of converting a color-block image into a first image according to an embodiment of the present disclosure.

FIG. 10 is a schematic diagram illustrating a process of converting a color-block image into a first image according to an embodiment of the present disclosure.

Referring to FIG. 10, for the first simulation pixels R3'3' and R5'5', the corresponding original pixels are R33 and B55.

When the first simulation pixel R3'3' is obtained, since the first simulation pixel R3'3' has the same color as the corresponding original pixel R33, the pixel value of the original pixel R33 is directly determined as the pixel value of the first simulation pixel R3'3' during conversion.

When the first simulation pixel R5'5' is obtained, since the first simulation pixel R5'5' has a color different from that of the corresponding original pixel B55, the pixel value of the original pixel B55 cannot be directly determined as the pixel value of the first simulation pixel R5'5', and it is required to calculate the pixel value of the first simulation pixel R5'5' according to an association pixel of the first simulation pixel R5'5' by a first interpolation algorithm.

It should be noted that, a pixel value of a pixel mentioned in the context should be understood in a broad sense as a color attribute value of the pixel, such as a color value.

There may be more than one association pixel unit including the association pixels for each first simulation pixel, for example, there may be four association pixel units, in which the association pixel units have the same color as the first simulation pixel and are adjacent to the image pixel unit including the original pixel at the same position as the first simulation pixel.

It should be noted that, "adjacent" here should be understood in a broad sense. Take FIG. 10 as an example, the first simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the first simulation pixel R5'5' include the original pixels R44, R74, R47 and R77. The first simulation pixel R5'5' is adjacent to and has the same color as the original pixels R44, R74, R47 and R77.

In different cases, the original pixels can be converted into the first simulation pixels in different ways, thus converting the color-block image into the first image. Since the filters in the Bayer array are adopted when shooting the image, the SNR of the image is improved. During the image processing procedure, the interpolation processing is performed on the color-block image by the first interpolation algorithm, such that the distinguishability and resolution of the image can be improved.

Figure 11:
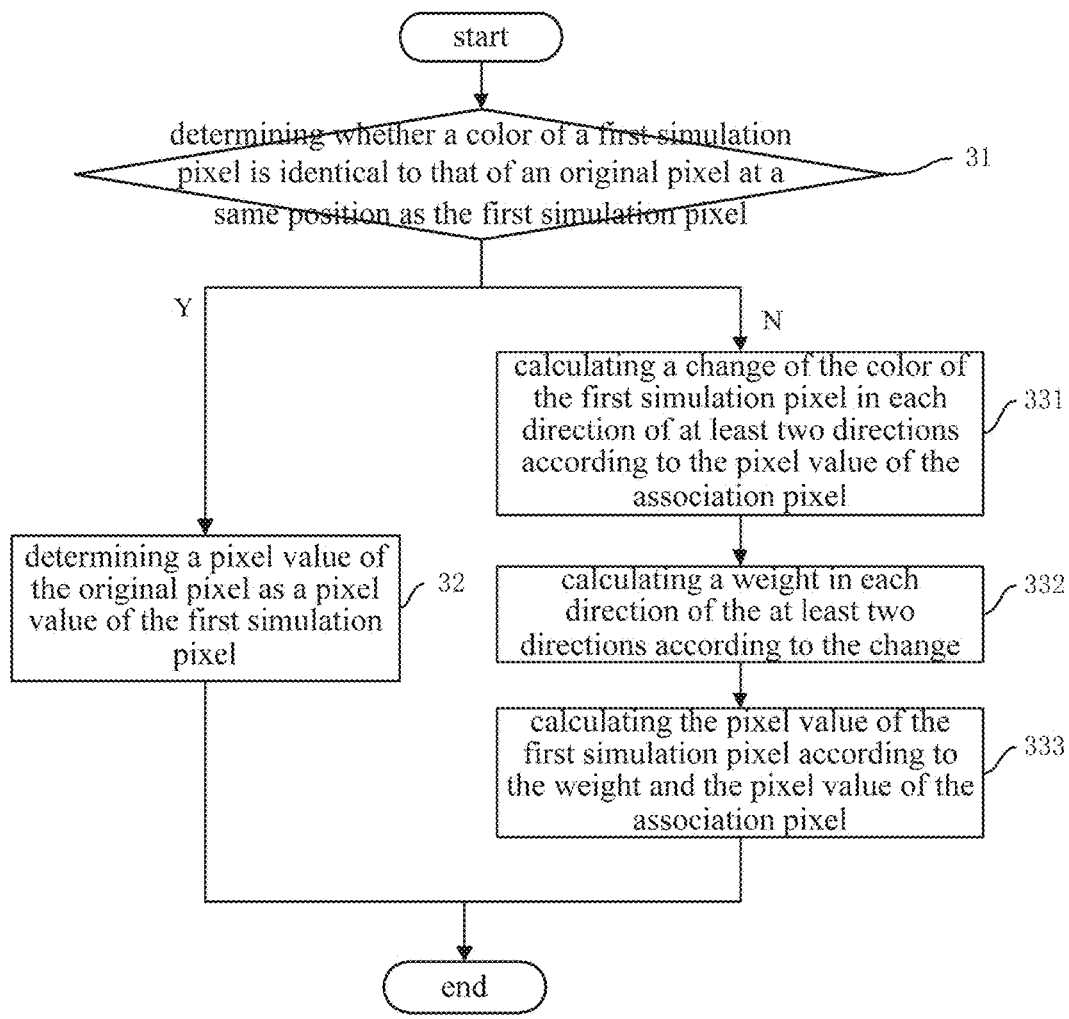
FIG. 11 is a flow chart illustrating a process of converting a part of the color-block image into a first image according to another embodiment of the present disclosure.

Referring to FIG. 11, in some implementations, the act at block 33 (determining the pixel value of the first simulation pixel according to the pixel value of the association pixel) includes the following.

At block 331, a change of the color of the first simulation pixel in each direction of at least two directions is calculated according to the pixel value of the association pixel.

At block 332, a weight in each direction of the at least two directions is calculated according to the change.

At block 333, the pixel value of the first simulation pixel is calculated according to the weight and the pixel value of the association pixel.

In detail, the first interpolation algorithm is realized as follows: with reference to energy changes of the image in different directions and according to weights of the association pixels in different directions, the pixel value of the first simulation pixel is calculated by a linear interpolation. From the direction having a smaller energy change, it can get a higher reference value, thus, the weight for this direction in the interpolation is high.

In some examples, for sake of convenience, only the horizontal direction and the vertical direction are considered.

The pixel value of the first simulation pixel R5'5' is obtained by an interpolation based on the original pixels R44, R74, R47 and R77. Since there is no original pixel with a same color as the first simulation pixel (i.e., R) in the horizontal direction and the vertical direction of the original pixel B55 corresponding the first simulation pixel R5'5', a component of this color (i.e., R) in each of the horizontal direction and the vertical direction is calculated according to the association pixels. The components in the horizontal direction are R45 and R75, the components in the vertical direction are R54 and R57. All the components can be calculated according to the original pixels R44, R74, R47 and R77.

In detail, R45=R44*⅔+R47*⅓, R75=⅔*R74+⅓*R77, R54=⅔*R44+⅓*R74, R57=⅔*R47+⅓*R77.

The change of color and the weight in each of the horizontal direction and the vertical direction are calculated respectively. In other words, according to the change of color in each direction, the reference weight in each direction used in the interpolation is determined. The weight in the direction with a small change is high, while the weight in the direction with a big change is low. The change in the horizontal direction is X1=|R45-R75|. The change in the vertical direction is X2=|R54-R57|, W1=X1/(X1+X2), W2=X2/(X1+X2).

After the above calculation, the pixel value of the first simulation pixel R5'5' can be calculated as R5'5'=(⅔*R45+⅓*R75)*W2+(⅔*R54+⅓*R57)*W1. It can be understood that, if X1>X2, then W1>W2. The weight in the horizontal direction is W2, and the weight in the vertical direction is W1, vice versa.

Accordingly, the pixel value of the first simulation pixel can be calculated by the first interpolation algorithm. After the calculations on the association pixels, the original pixels can be converted into the first simulation pixels arranged in the typical Bayer array. In other words, four adjacent first simulation pixels arranged in the 2-by-2 array include one red first simulation pixel, two green first simulation pixels and one blue first simulation pixel.

It should be noted that, the first interpolation algorithm is not limited to the above-mentioned method, in which only the pixel values of pixels with a same color as the first simulation pixel in the vertical direction and the horizontal direction are considered during calculating the pixel value of the first simulation pixel. In other embodiments, pixel values of pixels with other colors can also be considered.

Figure 12:
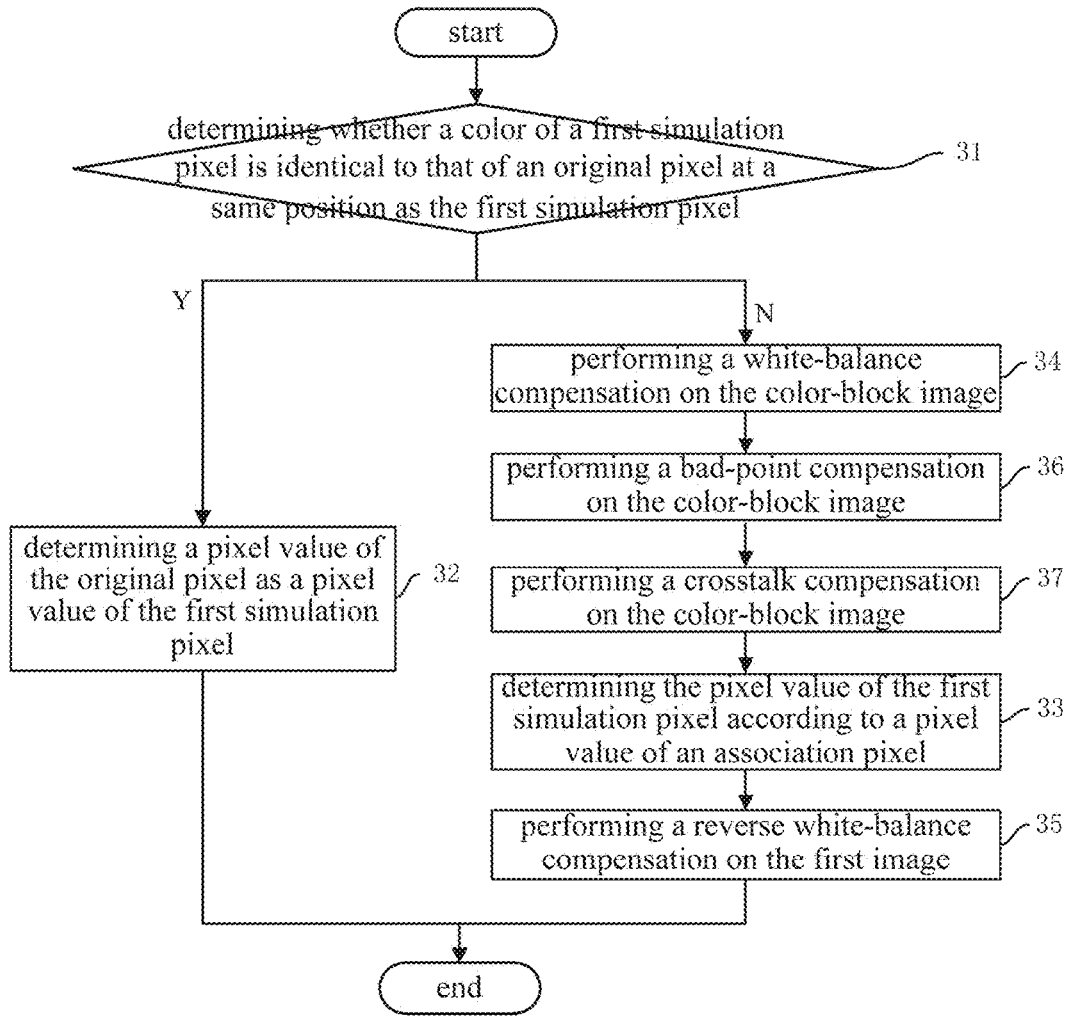
FIG. 12 is a flow chart illustrating a process of converting a part of the color-block image into a first image according to another embodiment of the present disclosure.

Referring to FIG. 12, in some embodiments, before the act at block 33, the method further includes performing a white-balance compensation on the color-block image, as illustrated at block 34.

Accordingly, after the act at block 33, the method further includes performing a reverse white-balance compensation on the first image, as illustrated at block 35.

In detail, in some examples, when converting the color-block image into the first image, during the interpolation using the first interpolation algorithm, the red and blue first simulation pixels not only refer to the color weights of original pixels having the same color as the first simulation pixels, but also refer to the color weights of original pixels with the green color. Thus, it is required to perform the white-balance compensation before the interpolation to exclude an effect of the white-balance in the interpolation calculation. In order to avoid damaging the white-balance of the color-block image, it is required to perform the reverse white-balance compensation after the interpolation calculation according to gain values of the red, green and blue colors in the compensation.

In this way, the effect of the white-balance in the first interpolation algorithm can be excluded, and the simulation image obtained after the interpolation can keep the white-balance of the color-block image.

Referring to FIG. 12 again, in some implementations, before the act at block 33, the method further includes performing a bad-point compensation on the color-block image, as illustrated at block 36.

It can be understood that, limited by the manufacturing process, there may be bad points in the image sensor 200. The bad point presents a same color all the time without varying with the photosensibility, which affects quality of the image. In order to ensure an accuracy of the interpolation and prevent from the effect of the bad points, it is required to perform the bad-point compensation before the first interpolation algorithm is performed.

In detail, during the bad-point compensation, the original pixels are detected. When an original pixel is detected as the bad point, the bad-point compensation is performed according to pixel values of other original pixels in the image pixel unit where the original pixel is located.

In this way, the effect of the bad point on the interpolation can be avoided, thus improving the quality of the image.

Referring to FIG. 12 again, in some implementations, before the act at block 33, the method includes performing a crosstalk compensation on the color-block image, as illustrated at block 37.

In detail, four photosensitive pixels 212 in one photosensitive pixel unit 210a cover the filters with the same color, and the photosensitive pixels 212 have differences in photosensibility, such that fixed spectrum noise may occur in pure-color areas in the first true-color image outputted after converting the first image and the quality of the image may be affected. Therefore, it is required to perform the crosstalk compensation.

Figure 13:
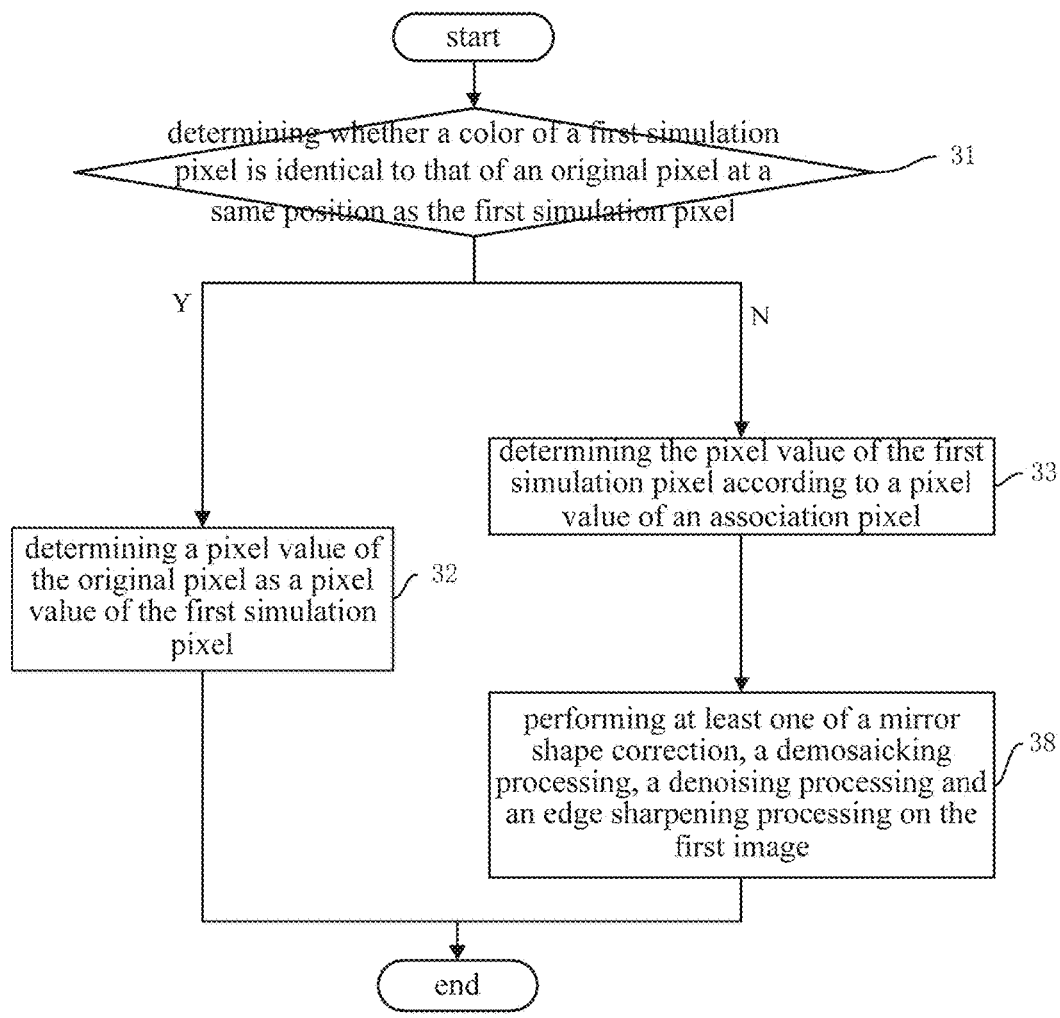
FIG. 13 is a flow chart illustrating a process of converting a part of the color-block image into a first image according to another embodiment of the present disclosure.

Referring to FIG. 13, in some implementations, after the act at block 33, the method further includes performing at least one of a mirror shape correction, a demosaicking processing, a denoising processing and an edge sharpening processing on the first image, as illustrated at block 38.

It can be understood that, after the color-block image is converted into the first image, the first simulation pixels are arranged in the typical Bayer array. The first image can be processed, during which, the mirror shape correction, the demosaicking processing, the denoising processing and the edge sharpening processing are included, such that the first true-color image can be obtained and output to the user.

For the merged image, referring to FIG. 8, since the merged image is not a typical Bayer array, the image sensor 200 merges the photosensitive pixels of 16M into pixels of 4M for directly outputting. Thus, in order to facilitate the merging of the color-block image and the merged image, it is required to process the merged image using the second interpolation algorithm to enlarge the merged image and convert the merged image into a restoration image which is the same in size as the color-block image.

In another aspect, the present disclosure also provides an image processing apparatus.

Figure 14:
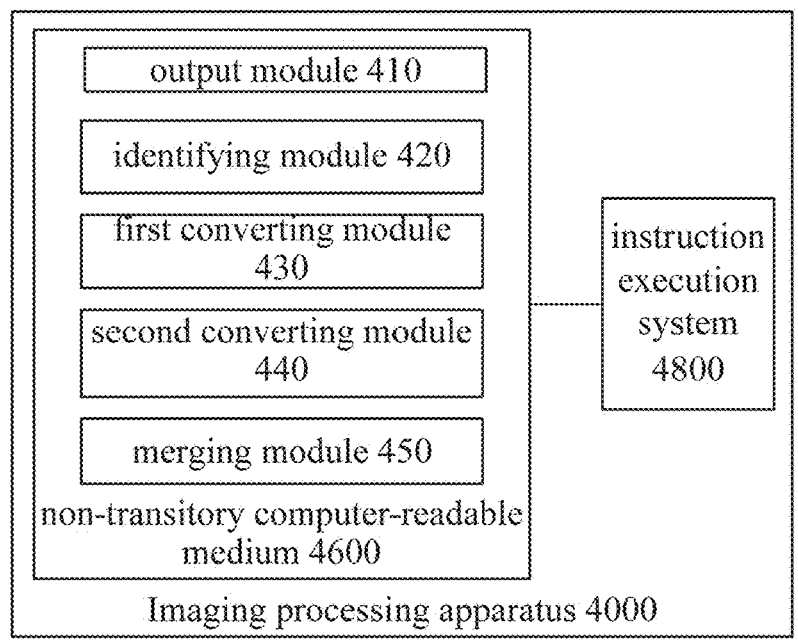
FIG. 14 is a block diagram of an image processing apparatus according to an embodiment of the present disclosure.

FIG. 14 is a block diagram of an image processing apparatus according to an embodiment of the present disclosure. Referring to FIG. 14 and FIGS. 2-3 and 6-7, an image processing apparatus 4000 is illustrated. The image processing apparatus 4000 is applied in an electronic device. As illustrated above, the electronic device includes an imaging apparatus including an image sensor 200, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212. The image processing apparatus 4000 includes a non-transitory computer-readable medium 4600 and an instruction execution system 4800. The non-transitory computer-readable medium 4600 includes computer-executable instructions stored thereon. As illustrated in FIG. 14, the non-transitory computer-readable medium 4600 includes a plurality of program modules, including an output module 410, an identifying module 420, a first converting module 430, a second converting module 440 and a merging module 450. The instruction execution system 4800 is configured by the instructions stored in the medium 4600 to implement the program modules.

The output module 410 is configured to output a merged image and a color-block image by the image sensor in a same scene, in which, the merged image includes an array of merged pixels, and the photosensitive pixels in a same photosensitive pixel unit are collectively output as one merged pixel, the color-block image includes image pixel units arranged in a preset array, each image pixel unit includes a plurality of original pixels, each photosensitive pixel unit corresponds to one image pixel unit, and each photosensitive pixel corresponds to one original pixel. The identifying module 420 is configured to identify a preset target region in the merged image. The first converting module 430 is configured to convert a part of the color-block image corresponding to a part of the merged image beyond the preset target region into a first image using a first interpolation algorithm, in which, the first image includes first simulation pixels arranged in an array, and each photosensitive pixel corresponds to one first simulation pixel. The second converting module 440 is configured to convert a part of the merged image within the preset target region into a second image using a second interpolation algorithm, in which, the second image includes second simulation pixels arranged in an array, and each photosensitive pixel corresponds to one second simulation pixel, and a complexity of the second interpolation algorithm is less than that of the first interpolation algorithm. The merging module 450 is configured to merge the first image and the second image into a simulation image.

In other words, the act at block 10 can be implemented by the output module 410. The act at block 20 can be implemented by the identifying module 420. The act at block 30 can be implemented by the first converting module 430. The act at block 40 can be implemented by the second converting module 440. The act at block 50 can be implemented by the merging module 450.

With the image processing apparatus according to embodiments of the present disclosure, the first interpolation algorithm is adopted for the part of the color-block image corresponding to a part of the merged image beyond the preset target regions such as the human face region so as to improve distinguishability and resolution of the image beyond the preset target region, and the second interpolation algorithm with complexity less than that of the first interpolation algorithm is adopted for the part of the merged image beyond the preset target region, the algorithm complexity includes the time complexity and the space complexity, such that SNR (signal to noise ratio), distinguishability and resolution of the image are improved, and time required for image processing is reduced, thereby improving user experience.

Figure 15:
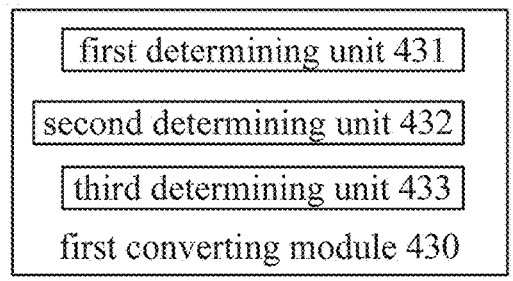
FIG. 15 is a block diagram of a first converting module according to an embodiment of the present disclosure.

Referring to FIG. 15, in some implementations, the first converting module 430 includes a first determining unit 431, a second determining unit 432 and a third determining unit 433. The act at block 31 can be implemented by the first determining unit 431. The act at block 32 can be implemented by the second determining unit 432. The act at block 33 can be implemented by the third determining unit 433. In other words, the first determining unit 431 is configured to determine whether a color of a first simulation pixel is identical to that of an original pixel at a same position as the first simulation pixel. The second determining unit 432 is configured to determine a pixel value of the original pixel as a pixel value of the first simulation pixel when the color of the first simulation pixel is identical to that of the original pixel at the same position as the first simulation pixel. The third determining unit 433 is configured to determine the pixel value of the first simulation pixel according to a pixel value of an association pixel when the color of the first simulation pixel is different from that of the original pixel at the same position as the first simulation pixel. The association pixel is selected from an image pixel unit with a same color as the first simulation pixel and adjacent to an image pixel unit including the original pixel.

Figure 16:
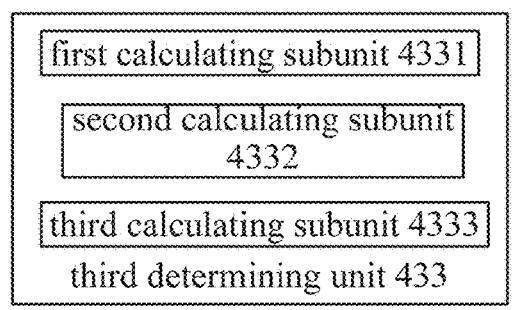
FIG. 16 is a block diagram of a third determining unit in the first converting module according to an embodiment of the present disclosure.

Referring to FIG. 16, in some implementations, the third determining unit 433 further includes a first calculating subunit 4331, a second calculating subunit 4332 and a third calculating subunit 4333. The act at block 331 can be implemented by the first calculating subunit 4331. The act at block 332 can be implemented by the second calculating subunit 4332. The act at block 333 can be implemented by the third calculating subunit 4333. In other words, the first calculating subunit 4331 is configured to calculate a change of the color of the first simulation pixel in each direction of at least two directions according to the pixel value of the association pixel. The second calculating subunit 4332 is configured to calculate a weight in each direction of the at least two directions according to the change. The third calculating subunit 4333 is configured to calculate the pixel value of the first simulation pixel according to the weight and the pixel value of the association pixel.

Figure 17:
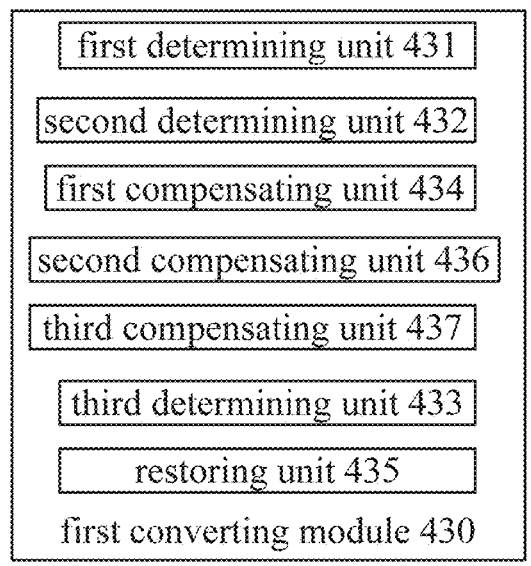
FIG. 17 is a block diagram of a first converting module according to another embodiment of the present disclosure.

Referring to FIG. 17, in some implementations, the first converting module 430 further includes a first compensating unit 434 and a restoring unit 435. The act at block 34 can be implemented by the first compensating unit 434. The act at block 35 can be implemented by the restoring unit 435. In other words, the first compensating unit 434 is configured to perform a white-balance compensation on the color-block image. The restoring unit 435 is configured to perform a reverse white-balance compensation on the first image.

In some implementations, the first converting module 430 further includes a second compensating unit 436. The act at block 36 can be implemented by the second compensating unit 436. In other words, the second compensating unit 436 is configured to perform a bad-point compensation on the color-block image.

In some implementations, the first converting module 430 further includes a third compensating unit 437. The act at block 37 can be implemented by the third compensating unit 437. In other words, the third compensating unit 437 is configured to perform a crosstalk compensation on the color-block image.

Figure 18:
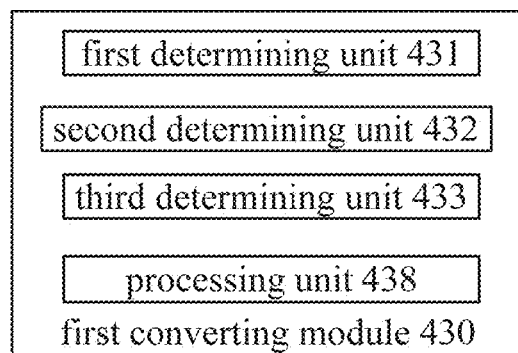
FIG. 18 is a block diagram of a first converting module according to another embodiment of the present disclosure.

FIG. 18 is a block diagram of a first converting module according to another embodiment of the present disclosure. Referring to FIG. 18, in some implementations, the first converting module 430 includes a processing unit 438. The act at block 38 can be implemented by the processing unit 438. In other words, the processing unit 438 is configured to perform at least one of a mirror shape correction, a demosaicking processing, a denoising processing and an edge sharpening processing on the first image.

The present disclosure also provides an electronic device.

Figure 19:
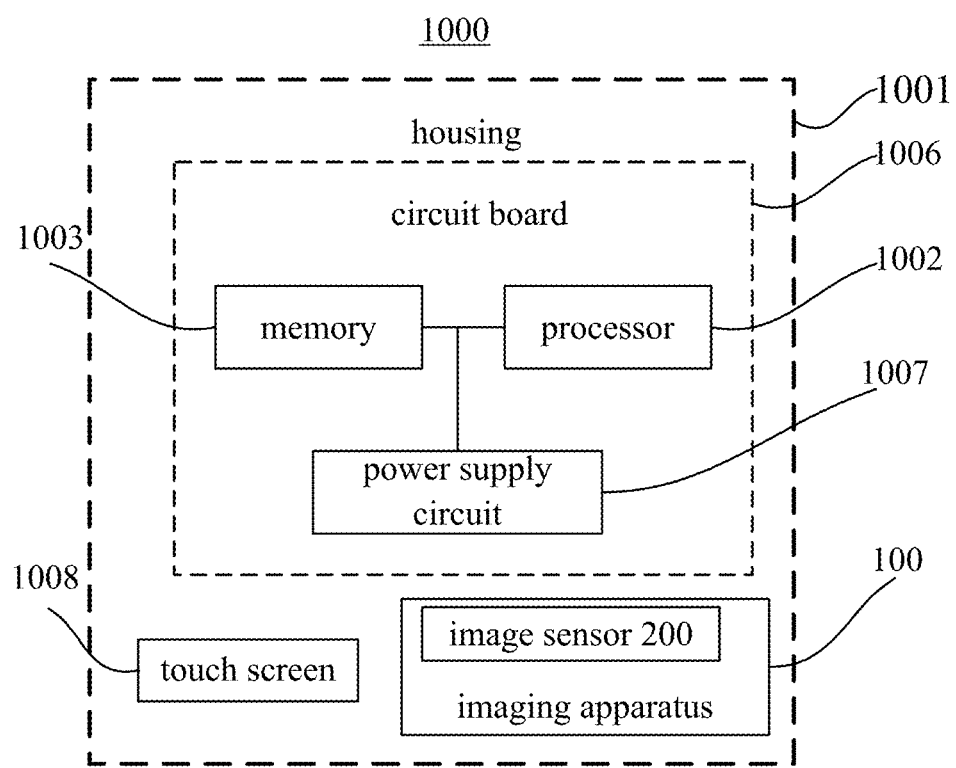
FIG. 19 is a block diagram of an electronic device according to an embodiment of the present disclosure.

FIG. 19 is a block diagram of an electronic device 1000 according to an embodiment of the present disclosure. Referring to FIG. 19, the electronic device 1000 of the present disclosure includes a housing 1001, a processor 1002, a memory 1003, a circuit board 1006, a power supply circuit 1007 and an imaging apparatus 100, The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The imaging apparatus 100 includes an image sensor 200. As illustrated above, the image sensor 200 includes an array 210 of photosensitive pixel units and an array 220 of filter units arranged on the array 210 of photosensitive pixel units. Each filter unit 220a corresponds to one photosensitive pixel unit 210a. In at least one embodiment, there is a one-to-one correspondence between the filter units and the photosensitive pixel units. Each photosensitive pixel unit 210a includes a plurality of photosensitive pixels 212.

The processor 1002 is configured to run a program corresponding to the executable program codes by reading the executable program codes stored in the memory 1003, to perform following operations: outputting a merged image and a color-block image by the image sensor in a same scene, in which, the merged image includes an array of merged pixels, and the photosensitive pixels in a same photosensitive pixel unit are collectively output as one merged pixel, the color-block image includes image pixel units arranged in a preset array, each image pixel unit includes a plurality of original pixels, each photosensitive pixel unit corresponds to one image pixel unit, and each photosensitive pixel corresponds to one original pixel; identifying a preset target region in the merged image; converting a part of the color-block image corresponding to a part of the merged image beyond the preset target region into a first image using a first interpolation algorithm, in which, the first image includes first simulation pixels arranged in an array, and each photosensitive pixel corresponds to one first simulation pixel; converting a part of the merged image within the preset target region into a second image using a second interpolation algorithm, in which, the second image includes second simulation pixels arranged in an array, and each photosensitive pixel corresponds to one second simulation pixel, and a complexity of the second interpolation algorithm is less than that of the first interpolation algorithm; and merging the first image and the second image into a simulation image.

In some implementations, the imaging apparatus includes a front camera or a real camera (not illustrated in FIG. 19).

In some implementations, the electronic device 1000 further includes a touch screen 1008.

In some implementations, the processor 1002 is configured to run a program corresponding to the executable program codes by reading the executable program codes stored in the memory 1003, to convert the part of the color-block image corresponding to the part of the merged image beyond the preset target region into the first image using a first interpolation algorithm by acts of: determining whether a color of a first simulation pixel is identical to that of an original pixel at a same position as the first simulation pixel; when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, in which the association pixel is selected from an image pixel unit with a same color as the first simulation pixel and adjacent to an image pixel unit including the original pixel.

In some implementations, the processor 1002 is configured to run a program corresponding to the executable program codes by reading the executable program codes stored in the memory 1003, to determine the pixel value of the first simulation pixel according to the pixel value of the association pixel by acts of: calculating a change of the color of the first simulation pixel in each direction of at least two directions according to the pixel value of the association pixel; calculating a weight in each direction of the at least two directions according to the change; and calculating the pixel value of the first simulation pixel according to the weight and the pixel value of the association pixel.

In some implementations, the processor 1002 is configured to run a program corresponding to the executable program codes by reading the executable program codes stored in the memory 1003, to perform following operations: performing a white-balance compensation on the color-block image; and performing a reverse white-balance compensation on the first image.

In some implementations, the processor 1002 is configured to run a program corresponding to the executable program codes by reading the executable program codes stored in the memory 1003, to perform following operations: performing at least one of a bad-point compensation and a crosstalk compensation on the color-block image.

In some implementations, the processor 1002 is configured to run a program corresponding to the executable program codes by reading the executable program codes stored in the memory 1003, to perform following operations: performing at least one of a mirror shape correction, a demosaicking processing, a denoising processing and an edge sharpening processing on the first image.

In some implementations, the electronic device may be an electronic equipment provided with an imaging apparatus, such as a mobile phone or a tablet computer, which is not limited herein.

The electronic device 1000 may further include an inputting component (not illustrated in FIG. 19). It should be understood that, the inputting component may further include one or more of the following: an inputting interface, a physical button of the electronic device 1000, a microphone, etc.

It should be understood that, the electronic device 1000 may further include one or more of the following components (not illustrated in FIG. 19): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, applied in an electronic device, wherein the electronic device comprises an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the image processing method comprises:
    outputting a merged image and a color-block image by the image sensor in a same scene, wherein, the merged image comprises an array of merged pixels, and the photosensitive pixels in a same photosensitive pixel unit are collectively output as one merged pixel, the color-block image comprises image pixel units arranged in a preset array, each image pixel unit comprises a plurality of original pixels, each photosensitive pixel unit corresponds to one image pixel unit, and each photosensitive pixel corresponds to one original pixel;
    identifying a preset target region in the merged image;
    converting a part of the color-block image corresponding to a part of the merged image beyond the preset target region into a first image using a first interpolation algorithm, wherein, the first image comprises first simulation pixels arranged in an array, and each photosensitive pixel corresponds to one first simulation pixel;
    converting a part of the merged image within the preset target region into a second image using a second interpolation algorithm, wherein, the second image comprises second simulation pixels arranged in an array, and each photosensitive pixel corresponds to one second simulation pixel, and a complexity of the second interpolation algorithm is less than that of the first interpolation algorithm; and
    merging the first image and the second image into a simulation image.

2. The image processing method according to claim 1, wherein converting the part of the color-block image corresponding to the part of the merged image beyond the preset target region into the first image using the first interpolation algorithm comprises:
    determining whether a color of a first simulation pixel is identical to that of an original pixel at a same position as the first simulation pixel;
    when the color of the first simulation pixel is identical to that of the original pixel at the same position as the first simulation pixel, determining a pixel value of the original pixel as a pixel value of the first simulation pixel; and
    when the color of the first simulation pixel is different from that of the original pixel at the same position as the first simulation pixel, determining the pixel value of the first simulation pixel according to a pixel value of an association pixel, wherein the association pixel is selected from an image pixel unit with a same color as the first simulation pixel and adjacent to an image pixel unit comprising the original pixel.

3. The image processing method according to claim 2, wherein determining the pixel value of the first simulation pixel according to the pixel value of the association pixel comprises:
    calculating a change of the color of the first simulation pixel in each direction of at least two directions according to the pixel value of the association pixel;
    calculating a weight in each direction of the at least two directions according to the change; and calculating the pixel value of the first simulation pixel according to the weight and the pixel value of the association pixel.

4. The image processing method according to claim 1, wherein the preset array comprises a Bayer array.

5. The image processing method according to claim 1, wherein the image pixel unit comprises original pixels arranged in an array.

6. The image processing method according to claim 1, further comprising:
performing a white-balance compensation on the color-block image; and
performing a reverse white-balance compensation on the first image.

7. The image processing method according to claim 1, further comprising:
performing at least one of a bad-point compensation and a crosstalk compensation on the color-block image.

8. The image processing method according to claim 1, further comprising:
performing at least one of a mirror shape correction, a demosaicking processing, a denoising processing and an edge sharpening processing on the first image.

9. The image processing method according to claim 1, wherein the preset target region comprises a human face.

10. An image processing apparatus, applied in an electronic device, wherein the electronic device comprises an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the image processing apparatus comprises a non-transitory computer-readable medium comprising computer-executable instructions stored thereon, and an instruction execution system which is configured by the instructions to implement at least one of:
an output module, configured to output a merged image and a color-block image by the image sensor in a same scene, wherein, the merged image comprises an array of merged pixels, and the photosensitive pixels in a same photosensitive pixel unit are collectively output as one merged pixel, the color-block image comprises image pixel units arranged in a preset array, each image pixel unit comprises a plurality of original pixels, each photosensitive pixel unit corresponds to one image pixel unit, and each photosensitive pixel corresponds to one original pixel;
an identifying module, configured to identify a preset target region in the merged image;
a first converting module, configured to convert a part of the color-block image corresponding to a part of the merged image beyond the preset target region into a first image using a first interpolation algorithm, wherein, the first image comprises first simulation pixels arranged in an array, and each photosensitive pixel corresponds to one first simulation pixel;
a second converting module, configured to convert a part of the merged image within the preset target region into a second image using a second interpolation algorithm, wherein, the second image comprises second simulation pixels arranged in an array, and each photosensitive pixel corresponds to one second simulation pixel, and a complexity of the second interpolation algorithm is less than that of the first interpolation algorithm; and
a merging module, configured to merge the first image and the second image into a simulation image.

11. The image processing apparatus according to claim 10, wherein the first converting module comprises:
a first determining unit, configured to determine whether a color of a first simulation pixel is identical to that of an original pixel at a same position as the first simulation pixel;
a second determining unit, configured to determine a pixel value of the original pixel as a pixel value of the first simulation pixel when the color of the first simulation pixel is identical to that of the original pixel at the same position as the first simulation pixel; and
a third determining unit, configured to determine the pixel value of the first simulation pixel according to a pixel value of an association pixel when the color of the first simulation pixel is different from that of the original pixel at the same position as the first simulation pixel, wherein the association pixel is selected from an image pixel unit with a same color as the first simulation pixel and adjacent to an image pixel unit comprising the original pixel.

12. The image processing apparatus according to claim 11, wherein the third determining unit comprises:
a first calculating subunit, configured to calculate a change of the color of the first simulation pixel in each direction of at least two directions according to the pixel value of the association pixel;
a second calculating subunit, configured to calculate a weight in each direction of the at least two directions according to the change; and
a third calculating subunit, configured to calculate the pixel value of the first simulation pixel according to the weight and the pixel value of the association pixel.

13. The image processing apparatus according to claim 10, wherein the preset array comprises a Bayer array.

14. The image processing apparatus according to claim 10, wherein the image pixel unit comprises original pixels arranged in an array.

15. The image processing apparatus according to claim 10, wherein the first converting module comprises:
a first compensating unit, configured to perform a white-balance compensation on the color-block image; and
a restoring unit, configured to perform a reverse white-balance compensation on the first image.

16. The image processing apparatus according to claim 10, wherein the first converting module further comprises at least one of a second compensating unit and a third compensating unit; wherein
the second compensating unit is configured to perform a bad-point compensation on the color-block image; and
the third compensating unit is configured to perform a crosstalk compensation on the color-block image.

17. The image processing apparatus according to claim 10, wherein the first converting module further comprises:
a processing unit, configured to perform at least one of a mirror shape correction, a demosaicking processing, a denoising processing and an edge sharpening processing on the first image.

18. The image processing apparatus according to claim 10, wherein the preset target region comprises a human face.

19. An electronic device, comprising a housing, a processor, a memory, a circuit board, a power supply circuit, and an imaging apparatus, wherein,
the circuit board is enclosed by the housing;
the processor and the memory are positioned on the circuit board;

the power supply circuit is configured to provide power for respective circuits or components of the electronic device;

the imaging apparatus comprises an image sensor, wherein the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels;

the memory is configured to store executable program codes; and the processor is configured to run a program corresponding to the executable program codes by reading the executable program codes stored in the memory, to perform following operations:

outputting a merged image and a color-block image by the image sensor in a same scene, wherein, the merged image comprises an array of merged pixels, and the photosensitive pixels in a same photosensitive pixel unit are collectively output as one merged pixel, the color-block image comprises image pixel units arranged in a preset array, each image pixel unit comprises a plurality of original pixels, each photosensitive pixel unit corresponds to one image pixel unit, and each photosensitive pixel corresponds to one original pixel;

identifying a preset target region in the merged image;

converting a part of the color-block image corresponding to a part of the merged image beyond the preset target region into a first image using a first interpolation algorithm, wherein, the first image comprises first simulation pixels arranged in an array, and each photosensitive pixel corresponds to one first simulation pixel;

converting a part of the merged image within the preset target region into a second image using a second interpolation algorithm, wherein, the second image comprises second simulation pixels arranged in an array, and each photosensitive pixel corresponds to one second simulation pixel, and a complexity of the second interpolation algorithm is less than that of the first interpolation algorithm; and merging the first image and the second image into a simulation image.

20. The electronic device according to claim 19, wherein the imaging apparatus comprises at least one of a rear camera and a front camera.

* * * * *